United States Patent
Polter et al.

(10) Patent No.: US 9,913,559 B2
(45) Date of Patent: Mar. 13, 2018

(54) HOPPER FOR A PELLET GRILL

(71) Applicant: Cabela's Incorporated, Sidney, NE (US)

(72) Inventors: H.R. Polter, Sidney, NE (US); Heath Aaron Darveau, Sidney, NE (US); Renee Irene Dorcey, Sidney, NE (US); Alex James Mousel, Sidney, NE (US)

(73) Assignee: CABELA'S LLC, Sidney, NE (US)

( * ) Notice: Subject to any disclaimer, the term of this patent is extended or adjusted under 35 U.S.C. 154(b) by 658 days.

(21) Appl. No.: 14/543,222

(22) Filed: Nov. 17, 2014

(65) Prior Publication Data
US 2015/0136113 A1 May 21, 2015

Related U.S. Application Data

(60) Provisional application No. 61/905,675, filed on Nov. 18, 2013.

(51) Int. Cl.
*A47J 37/07* (2006.01)

(52) U.S. Cl.
CPC ........... *A47J 37/0786* (2013.01); *A47J 37/07* (2013.01)

(58) Field of Classification Search
CPC ....... A47J 37/07; A47J 37/0786; A47J 37/079
See application file for complete search history.

(56) References Cited

U.S. PATENT DOCUMENTS

2010/0218754 A1* 9/2010 Kuntz ................ A47J 37/0786
                                                      126/25 R
2013/0255546 A1* 10/2013 Jones ...................... F23N 1/002
                                                        110/186

OTHER PUBLICATIONS

Pellet Hopper, "Black Olive Grill Product Review", May 5, 2013, from seriousbirder.com website [online] [retrieved on Feb. 16, 2015], 8 pages. Retrieved from <URL: http://seriousbirder.com/blogs/black-olive-grill-product-review/>.
Fast Eddy's by Cookshack™ Pellet Grill, Model PG500 and PG1000 Operators Manual, V. 14, from cookshack.com website [online] [retrieved on Feb. 16, 2015], 19 pages. Retrieved from <URL: http://www.cookshack.com/store/Operators-Manuals>.

* cited by examiner

*Primary Examiner* — Alfred Baschias
(74) *Attorney, Agent, or Firm* — Pillsbury Winthrop Shaw Pittman, LLP

(57) ABSTRACT

An improved hopper for a pellet grill that permits a first type of flavored pellet to be cleared from the hopper of a pellet grill so that a second type of flavored pellet may be loaded into the hopper for cooking and smoking. The disclosed hopper can also have a viewing window formed in its side for establishing how much, if any, of a pellet material is currently loaded into the hopper.

8 Claims, 9 Drawing Sheets

HOPPER FOR A PELLET GRILL

CROSS-REFERENCE TO RELATED APPLICATION

This application claims priority to U.S. Provisional Patent Application No. 61/905,675 filed on Nov. 18, 2013 and entitled "HOPPER FOR A PELLET GRILL."

BACKGROUND

This disclosure relates to an improved hopper for a grill that uses pellets as fuel.

Some grills and smokers use consumable wood pellets or chips for the heating and smoking of food. These wood pellets come in a variety of flavors including oak, hickory, apple, maple, cherry, and mesquite just to name a few. When consumed, these wood pellets quickly emit heat to cook the food and produce a smoke that is absorbed by the food to enrich its flavor.

In a pellet grill, typically the food to be cooked and smoked is placed in a closed chamber for preparation. An adjacent hopper, which is often mounted to the chamber, stores the pellets which are used as fuel to heat and provide a smoke to the food in the chamber. Conventionally, the pellets from the hopper are controllably fed into the chamber by the rotation of an auger in a channel that runs along the underside of the chamber and is in communication with the chamber. As the pellets pass through the channel by the motion of the auger, one or more heating elements (often electric) heat the pellets to cause the pellets to emit smoke and heat energy that cooks and flavors the food being prepared in the chamber. After their consumption, the used pellets or the portion of the pellets that remains may be fed into a bucket or other vessel for safe disposal once they are sufficiently cooled.

During typical use, the pellets are fed into the hopper through an upper opening in the hopper. The pellets then reside in the hopper until they are consumed during a cooking or smoking operation. This often requires that the chef or grill master use all of the pellets of one flavor that are loaded into the hopper before switching to another flavor. Furthermore, it is often difficult to determine how much of the loaded pellets remain in the hopper as the sidewalls of the hopper are often opaque and a view into the hopper from the top does not often indicate how full the hopper is, as the bottom of the hopper cannot be seen.

Hence, a need exists for a way to establish how much of a pellet material is left in a hopper for a pellet grill and to quickly permit a change of one flavor to another different flavor in a pellet grill.

SUMMARY OF THE INVENTION

An improved hopper for a pellet grill is now disclosed that permits for a first type of flavored pellet to be cleared from the hopper of a pellet grill so that a second type of flavored pellet may be loaded into the hopper for cooking and smoking. The disclosed hopper can also have a viewing window formed in a side thereof for establishing how much, if any, of a pellet material is currently loaded into the hopper.

According to one aspect, an apparatus is disclosed which is adapted to hold fuel pellets that are supplied to a heating device for a food product. The apparatus includes a hopper including a base wall with side walls extending upwardly from the base wall. The base wall and side walls define an interior volume of the hopper. In the base wall of the hopper, there is an opening and a discharge chute extending downwardly from the hopper to provide an exit passage extending from the opening located in the base wall of the hopper to an outlet of the discharge chute. A movable baffle can be positioned to selectively cover the opening in the base wall of the hopper. The movable baffle has a closed position in which the baffle covers the opening in the base wall of the hopper such that the interior volume of the hopper and the exit passage of the discharge chute are not in substantial communication with one another. The movable baffle also has an opened position in which the interior volume of the hopper and the exit passage of the discharge chute are in substantial communication with one another.

When the interior volume of the hopper contains the fuel pellets and the movable baffle is in the closed position, the fuel pellets can be substantially retained in the hopper for supplying to the heating device. Upon movement of the movable baffle from the closed position to the opened position, the opening of the base wall can be uncovered to accommodate an evacuation of the fuel pellets from the hopper through the exit passage of the discharge chute to the outlet. Accordingly, the pellets may be removed from the hopper without passing the pellets from the hopper through the heating device (i.e., consuming them).

The heating device may be at least one of a grill and a smoker and may be a combination grill and smoker.

In some forms, the apparatus may include an actuation mechanism. The actuation mechanism may extend through side wall and/or the base wall of the hopper and may be operatively connected to the movable baffle to effectuate movement of the baffle between the closed position and the opened position. The effectuated movement of the movable baffle may occur in a direction of linear translation along the base wall. It is contemplated that, in some forms, the actuation mechanism may be a rod that links an exterior handle to the movable baffle to effectuate such movement.

To permit the movement of the movable baffle, the movable baffle may be substantially planar and may be substantially parallel with the base wall of the hopper. In this way, the baffle may move within the interior volume of the hopper, even when the hopper is at least partially loaded with pellets.

In one form, a hook may be supported by the discharge chute proximate the outlet of the discharge chute. The hook may be adapted to receive a bucket thereon for collection of the fuel pellets evacuated from the hopper. Such evacuated pellets collected in this bucket or other container could potentially be reused as these pellets would not have been consumed during heating or smoking.

In one particular form, there may be viewing window disposed on at least one of the side walls of the hopper. This viewing window can permit a user to view a level of the pellets inside the hopper from an exterior of the hopper. This viewing window may be made of an optically transparent material.

In another aspect, an apparatus can include the viewing window without necessarily including the ability to remove the pellets from the hopper. According to this aspect, the apparatus is again adapted to hold fuel pellets for supplying to a heating device for a food product. Again, the apparatus includes a hopper including a base wall with side walls extending upwardly from the base wall and the base wall and side walls define an interior volume of the hopper. A viewing window is disposed on one or more of the side walls of the hopper in which the viewing window permits a user to view a level of the fuel pellets inside the hopper from an exterior of the hopper.

Again, this viewing window may be formed from an optically transparent material.

Even according to this aspect, the apparatus may still include an opening located in the base wall of the hopper and a discharge chute extending downwardly from the hopper and providing an exit passage extending from the opening located in the base wall of the hopper to an outlet of the discharge chute. As described above, a movable baffle may be positioned to selectively cover the opening in the base wall of the hopper. This movable baffle can have a closed position (in which the baffle covers the opening in the base wall of the hopper such that the interior volume of the hopper and the exit passage of the discharge chute are not in substantial communication with one another) and an opened position (in which the interior volume of the hopper and the exit passage of the discharge chute are in substantial communication with one another). When the interior volume of the hopper contains the fuel pellets and the movable baffle is in the closed position, the fuel pellets may be substantially retained in the hopper for supplying to the heating device for the food product. Then, upon movement of the movable baffle from the closed position to the opened position, the opening may be uncovered to accommodate an evacuation of the fuel pellets from the hopper through the exit passage of the discharge chute to the outlet without passing the fuel pellets from the hopper through the heating device.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

Figure 1:
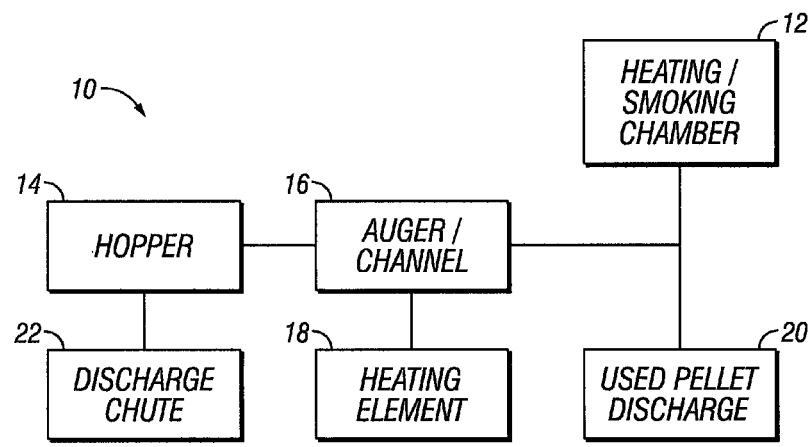
FIG. 1 is a schematic illustrating the various parts of an apparatus for heating and smoking a food product.
Figure 2A:
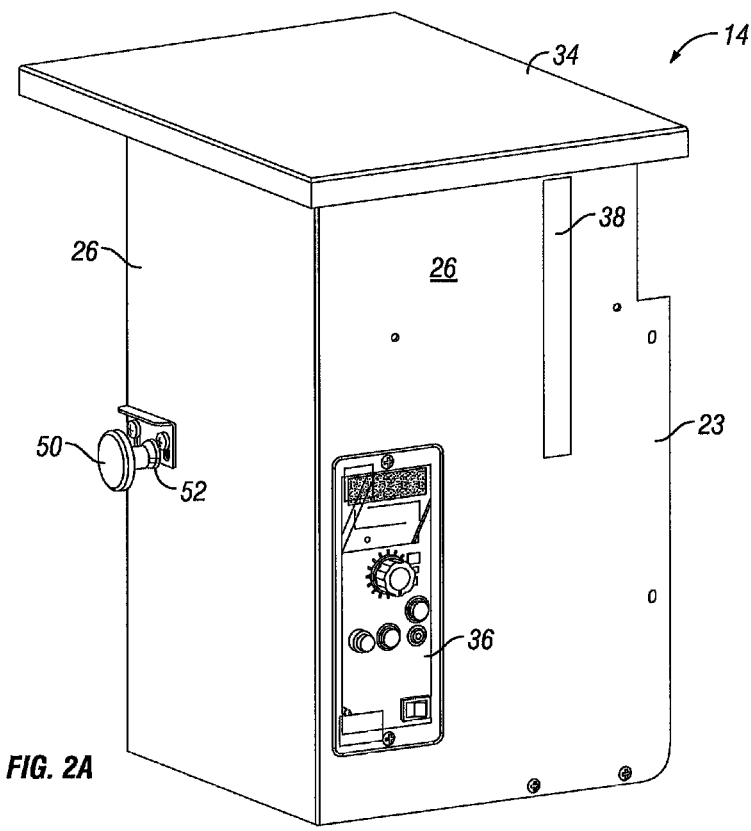
FIG. 2A is a top front left side view of the exterior of an improved hopper according to one aspect of the invention in which a movable baffle is in a closed position.
Figure 2B:
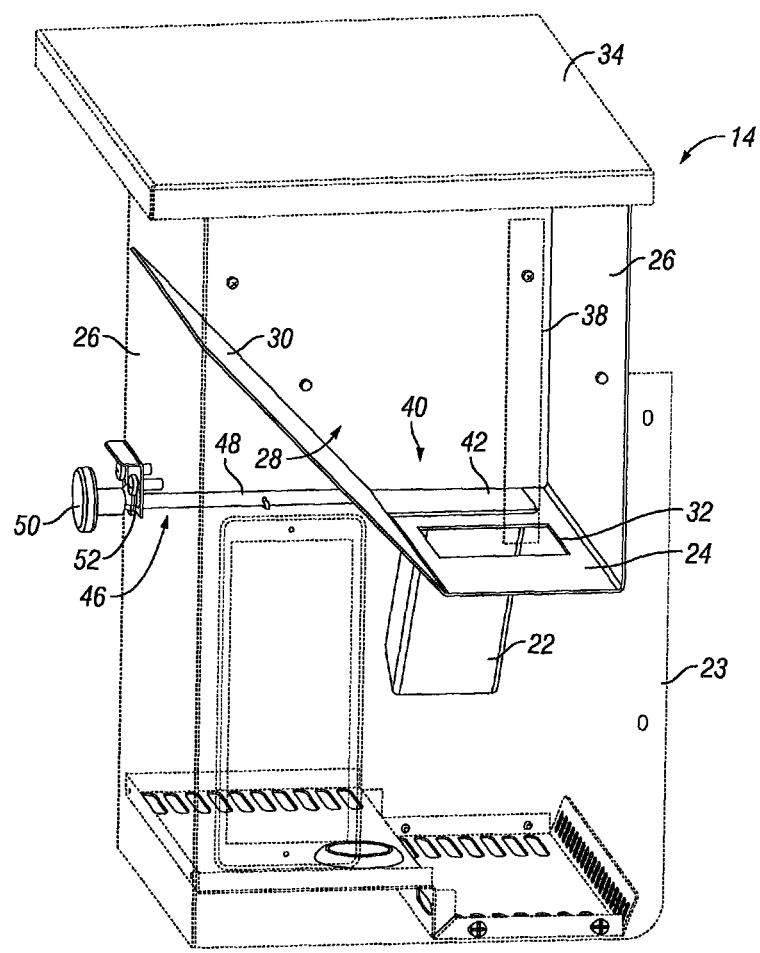
FIG. 2B is a top front left side view of the hopper of FIG. 2A in which the exterior housing walls of the hopper have been made transparent to illustrate the internal structure of the hopper as well as the discharge chute. In this view, it is clear that the movable baffle is in a closed position such that any pellets in the hopper would be retained in the hopper.
Figure 2C:
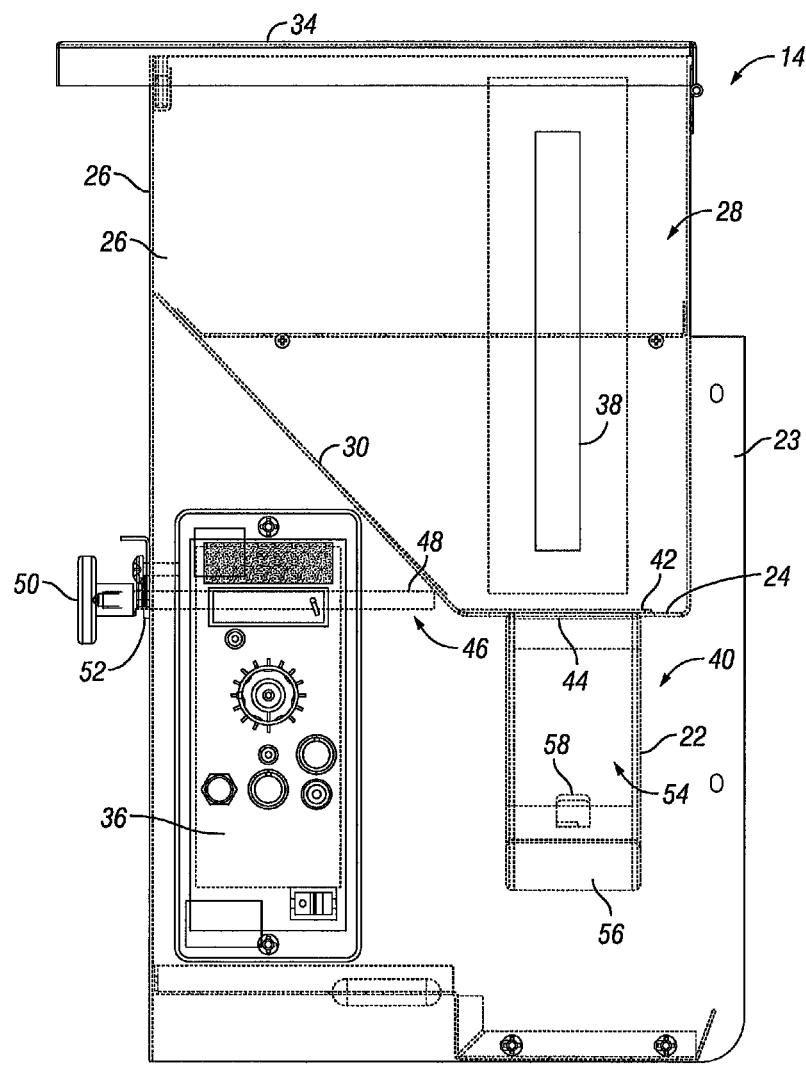
FIG. 2C is a front plan view of the hopper of FIG. 2A in which the exterior walls of the hopper are transparent to reveal some of the interior structure of the hopper as well as the discharge chute.
Figure 2D:
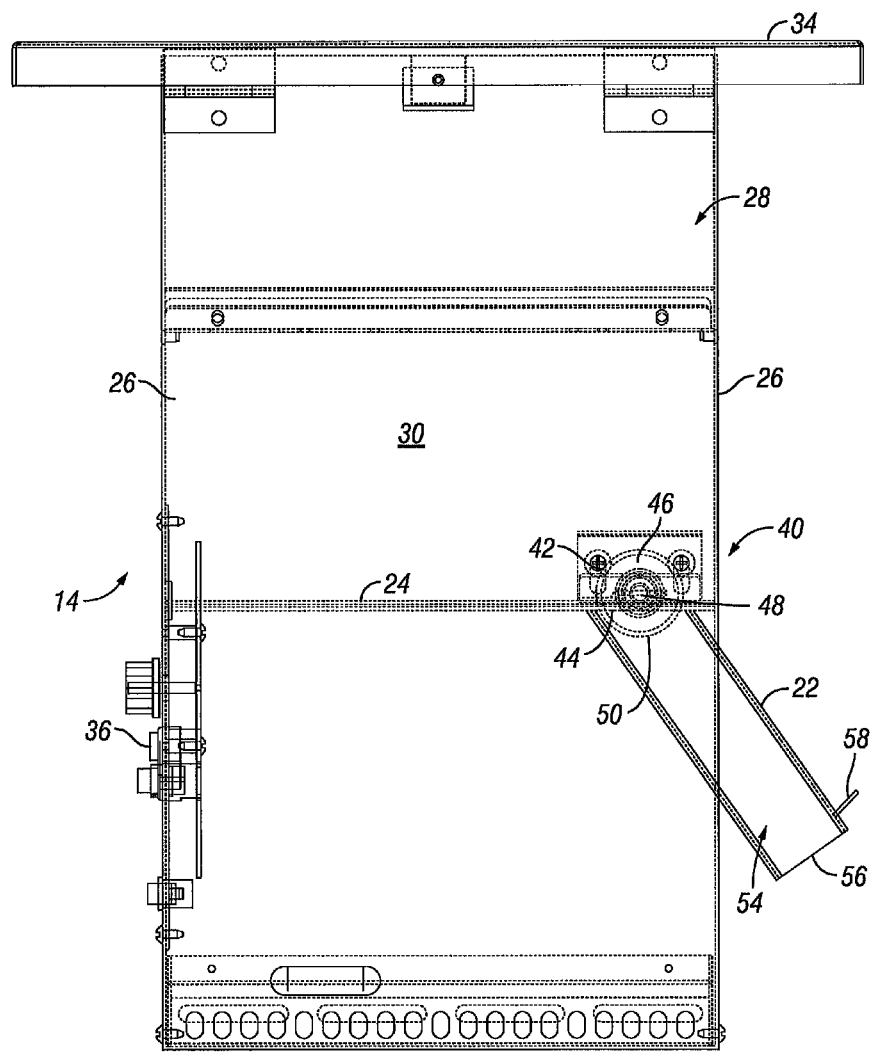
FIG. 2D is a right side plan view of the hopper of FIG. 2A in which the exterior walls have been made transparent to again reveal the interior structure of the hopper as well as the discharge chute.
Figure 2E:
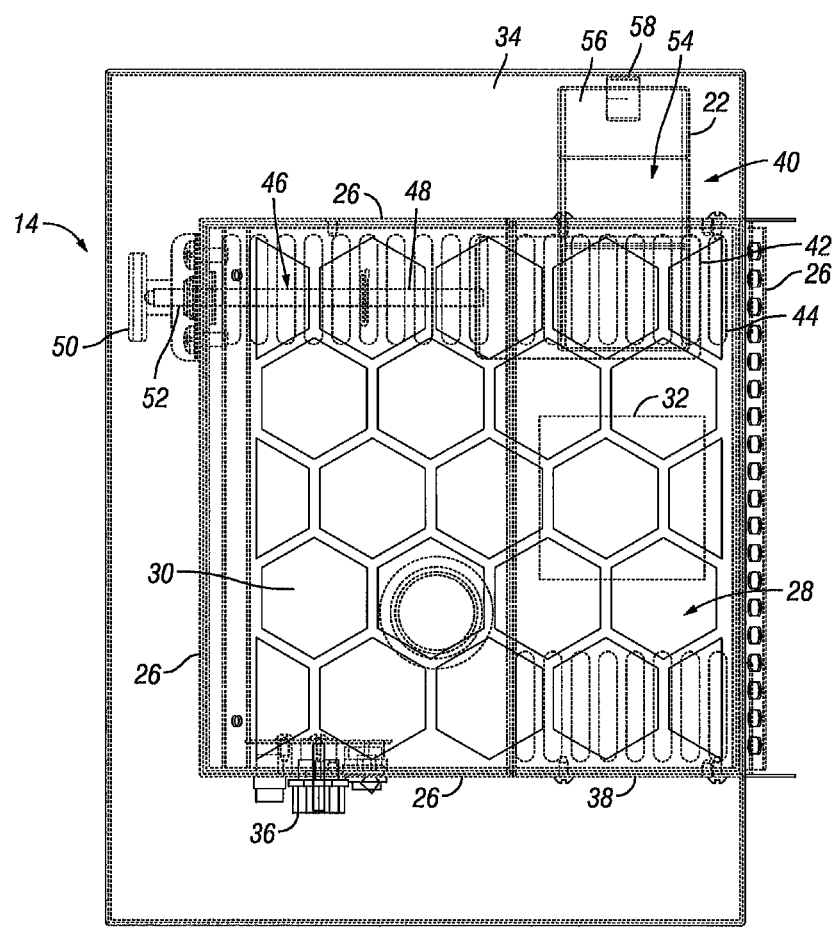
FIG. 2E is a top plan view of the hopper of FIG. 2A in which the walls of the hopper have been made transparent to reveal the interior structure of the hopper and the discharge chute.

Referring first to FIG. 1, an apparatus or pellet grill 10 is illustrated schematically. This schematic is representative of a pellet grill 10 that can incorporate the invention; however, the invention should not be limited to the specific type of pellet grill 10 schematically illustrated or described in this application. Structural variations to the grill 10 as well as its constituent components are contemplated without deviating from the scope of the invention as claimed. Accordingly, the illustrated grill 10 should be considered exemplary, but not limiting.

The pellet grill 10 includes a heating/smoking chamber 12 in which the food to be prepared may be placed. Conventionally, this heating/smoking chamber 12 includes grates or racks on which the food to be prepared is placed. The heating/smoking chamber 12 also typically has a door or lid attached to a base. The door or lid may be opened relative to the base to provide selective access into the heating/smoking chamber 12 in order to place food in or remove food from the chamber 12. Further, during operation, this door or lid can be closed to close the heating/smoking chamber 12 so as to best retain any heat and smoke supplied to the heating/smoking chamber 12 in the heating/smoking chamber 12 for food preparation.

A hopper 14, which typically contains wood pellets for producing the heat and smoke, is often physically attached or mounted to the heating/smoking chamber 12 to supply pellets thereto. Pellets may be transported from the hopper 14 using a channel and auger arrangement 16. This channel and auger arrangement 16 typically includes an auger centrally disposed in a channel that runs along an underside of the heating/smoking chamber 12. The channel includes openings or the like that place the channel in the channel and auger arrangement 16 in gaseous communication with the heating/smoking chamber 12. When the auger is rotated within the channel, pellets are drawn from the hopper 14 and transported via the auger through the channel. Somewhere along the length of the channel, there are one or more heating elements 18 (often electrical heating elements) that locally heat the wood pellets and cause the pellets to emit heat and smoke for the heating/smoking chamber 12. After the consumption of the pellets, the channel and auger arrangement 16 further transports the consumed pellets (or remains thereof) to a used pellet discharge port 20. At the used pellet discharge port 20, the pellets can exit the pellet grill 10. Often there is a bucket, container, tray, or the like disposed at the used pellet discharge port 20 because the consumed pellet material may still be hot and it may not be appropriate for these pellets to exit the grill 10 and fall directly onto the ground. If collected in a bucket, container, tray, or other holder, then these consumed pellets can be permitted to cool before disposal or safely carried while hot to a location for disposal of a hot material.

Conventionally, pellets are loaded into the hopper 14 through an upper opening providing access into the hopper 14. Notably, and as will be described in further detail below, the improved hopper 14 for the pellet grill 10 also includes a discharge chute 22, through which non-consumed pellets may be removed or cleared from the hopper 14, such that the pellets of a first flavor may be vacated from the hopper 14 and replaced with pellets of a different flavor.

Now with additional reference to FIGS. 2A-2E and FIGS. 3A-3C, one embodiment of the improved hopper 14 in accordance with the invention is illustrated. The difference between FIGS. 2A-2E and FIGS. 3A-3C is that the discharge chute 22 is closed (i.e., not in communication with the hopper 14) in FIGS. 2A-2E while the discharge chute 22 is open (i.e., in communication with the hopper 14) in FIGS. 3A-3C. In FIGS. 2A-2E and 3A-3C, the hopper 14 is illustrated alone and apart from the heating/smoking chamber 12. This hopper 14 might be mounted, for example to the heating/smoking chamber 12 at a mounting flange 23 formed on one side of the housing 14.

The hopper 14 includes a base wall 24 with side walls 26 extending upwardly therefrom to define an interior volume 28. In the particular form illustrated, the sidewalls 26 run the entire length of the hopper 14 and the base wall 24 of the hopper 14 is located approximately half way up the height of the side walls 26. Further, as illustrated, one of the side walls 26 includes an angled or oblique side wall 30 that slants down to the base wall 24. When the hopper 14 is filled with pellets, having such an oblique side wall 30 can help to direct the pellets to an opening 32 in the base wall 24. When the pellets fall through this opening 32 in the base wall 24 of the hopper 14, the pellets drop into the auger and channel arrangement 16 for feeding below the heating/smoking chamber 12.

The hopper 14 also includes an upper cover 34, which can be removed to fill the interior volume 28 of the hopper 14 with pellets. Then re-attached to the body of the hopper 14, the upper cover 34 may also provide a surface on which items (i.e., utensils, plates, and so forth) can be placed during use of the pellet grill 10. In one embodiment, the upper cover 34 is hingedly coupled to the hopper 14 and may include a magnetic latch to retain the upper cover 34 is a closed position.

Additionally, bottom of the housing for the hopper 14 may support controls 36 (electrical or otherwise) for controlling operation of the grill 10. In one form, the controls 36 might control the auger and channel arrangement 16 and operation of the heating elements 18. However, these controls 36 may perform other functions and it is also contemplated that the grill 10 has multiple controls at different locations over the grill 10.

Notably, the hopper 14 also includes a viewing window 38 and a pellet ejection mechanism 40 that are not found on conventional hoppers.

The viewing window 38 is disposed on a front one of the side walls 26. In the form illustrated, this viewing window 38 is a slender rectangular shape that extends substantially the height of the hopper 14, although there can be some amount of framing material at the top and bottom. As the useable amount of the interior volume 28 of the hopper 14 is substantially found in the top half of the housing in the embodiment illustrated, this viewing window 38 only extends approximately half of the full height of the housing.

As the name implies, this viewing window 38 permits a user to view a level (i.e., a height) of the fuel pellets in the interior volume 28 of the hopper 14 from an exterior of the hopper 14. Among other things, this means that the user does not need to remove the upper cover 34 of the hopper 14 in order to assess the amount of pellets in the hopper 14. As an added advantage, this side view of the level of the fuel pellets in the hopper 14 provides a better indication of the occupied interior volume 28. In contrast, a top down view into the hopper 14 does not always provide a reliable indication of how deep the pellets are, because there is not a clear frame of reference from the top of where the base wall 24 or bottom of the interior volume 28 is.

Accordingly, the viewing window 38 is composed of an optically transparent material, meaning that it transmits a sufficient amount of light to view the interior volume 28 of the hopper 14 through the viewing window 38 with the naked eye. It is contemplated that the material could be any one of a number of optically transparent materials including, but not limited to glass or polymeric materials. In some forms, it is contemplated that the viewing window 38 might be a mesh material with openings that permit a visual inspection of the interior volume 28 of the hopper 14 through the side walls 26 without permitting the pellets to pass through. In any event, it is contemplated that the material may be of sufficient durability that it can withstand the increase in temperature that it may receive being in relatively close proximity to the heating/smoking chamber 12 as well as resist significant scratching or damage that may adversely affect the transparency of the material.

Although the viewing window 38 is shown on one side of the side walls 26 in the illustrated embodiment, it is contemplated that there could be more than one viewing window and that if there are more than one viewing windows, then these viewing windows could be located on various side walls 26. Still further, it is contemplated that a viewing window might be disposed at a corner or edge where two of the side walls 26 meet. Among other things, having multiple viewing windows or viewing windows located at a corner may improve the viewability of the pellets in the interior volume 28 of the hopper 14, as light transmitted through one of the viewing windows may be transmitted to the region of another viewing window or from one surface of a corner viewing window to another surface of a corner viewing window.

Also notably, the hopper 14 includes a pellet ejection mechanism 40 for selectively evacuating pellets from the hopper 14. The pellet ejection mechanism 40 is illustrated as being closed in FIGS. 2A-2E and as being opened in FIGS. 3A-3C.

The pellet ejection mechanism 40 includes a movable baffle 42 that is positionable or actuatable to selectively cover an opening 44 in the base wall 24 of the hopper 14. This opening 44 can connect the interior volume 28 of the hopper 14 to the discharge chute 22. To avoid any confusion, it is noted that the opening 44 that can connect the interior volume 28 of the hopper 14 and the discharge chute 22 is a different opening than the opening 32 in the base wall 24 that feed the pellets to the channel and auger arrangement 16 for consumption.

In the form illustrated, the movable baffle 42 is a substantially planar plate that is substantially parallel with and is slidable over the top surface of the base wall 24. The movable baffle 42 is sized to be slightly larger than the opening 44, such that the movable baffle 42 can fully cover the opening 44. As illustrated, the plate of the movable baffle 42 is generally rectangular in form but, on the side of the plate that is closest to the oblique side wall 30, there is a small section that is angled upward for attachment to an actuation mechanism 46.

The actuation mechanism 46 includes a rod 48 that is, on a first end, connected to this angled side of the movable baffle 42 and, on a second end, connected to an exterior handle 50. The rod 48 extends through the oblique side wall 30 and through a bearing opening 52 formed in one of the side walls 26 on which the rod 48 bears and is guided during linear movement.

Figure 3A:
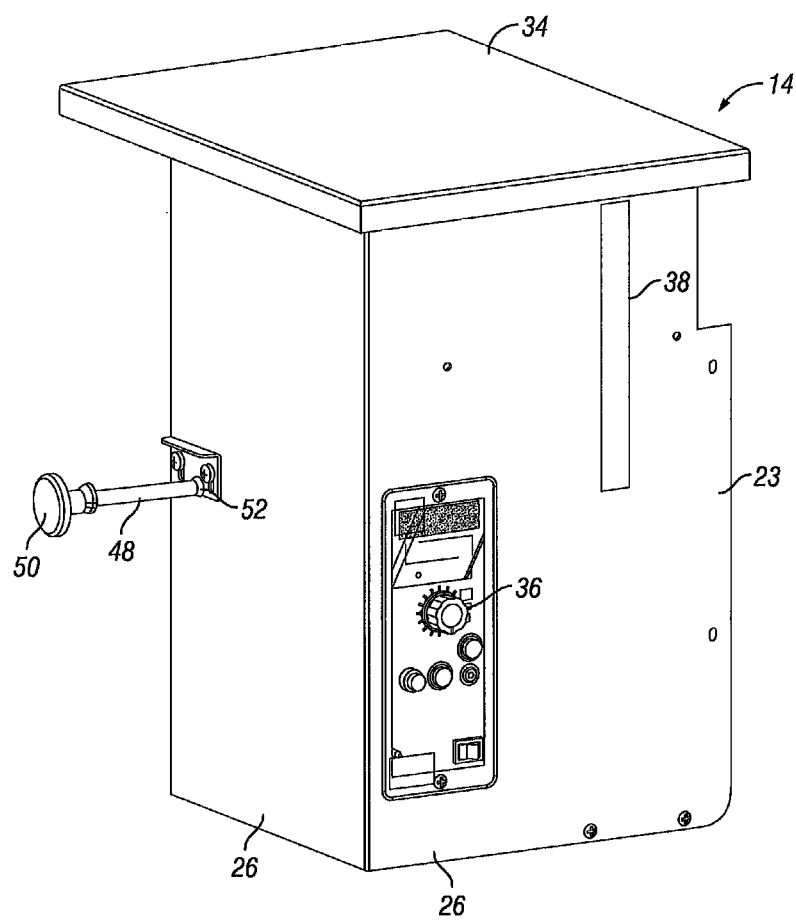
FIG. 3A is a top front left side view of the hopper from FIGS. 2A-2E, but in which the movable baffle has been opened.
Figure 3B:
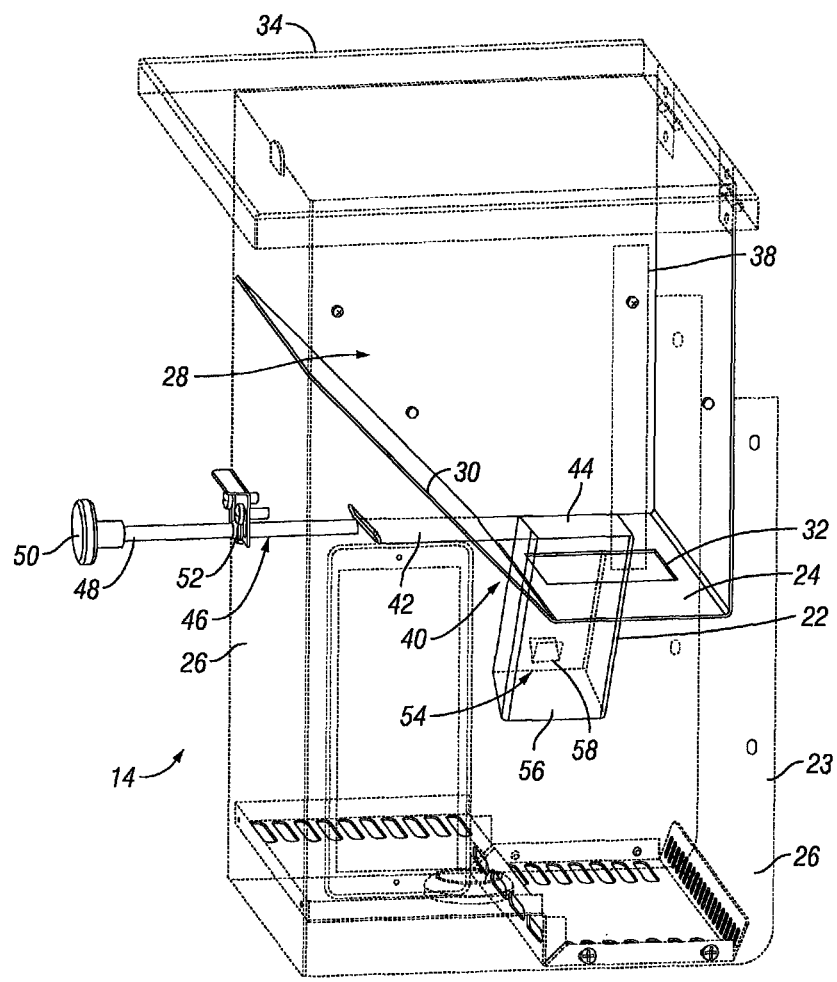
FIG. 3B is a top front left side view of the hopper of FIG. 3A in which the exterior housing walls of the hopper have been made transparent to illustrate the internal structure of the hopper as well as the discharge chute. In this view, it is clear that the movable baffle has been moved to an open position such that the hopper is placed in communication with the discharge chute to empty any pellets in the hopper.
Figure 3C:
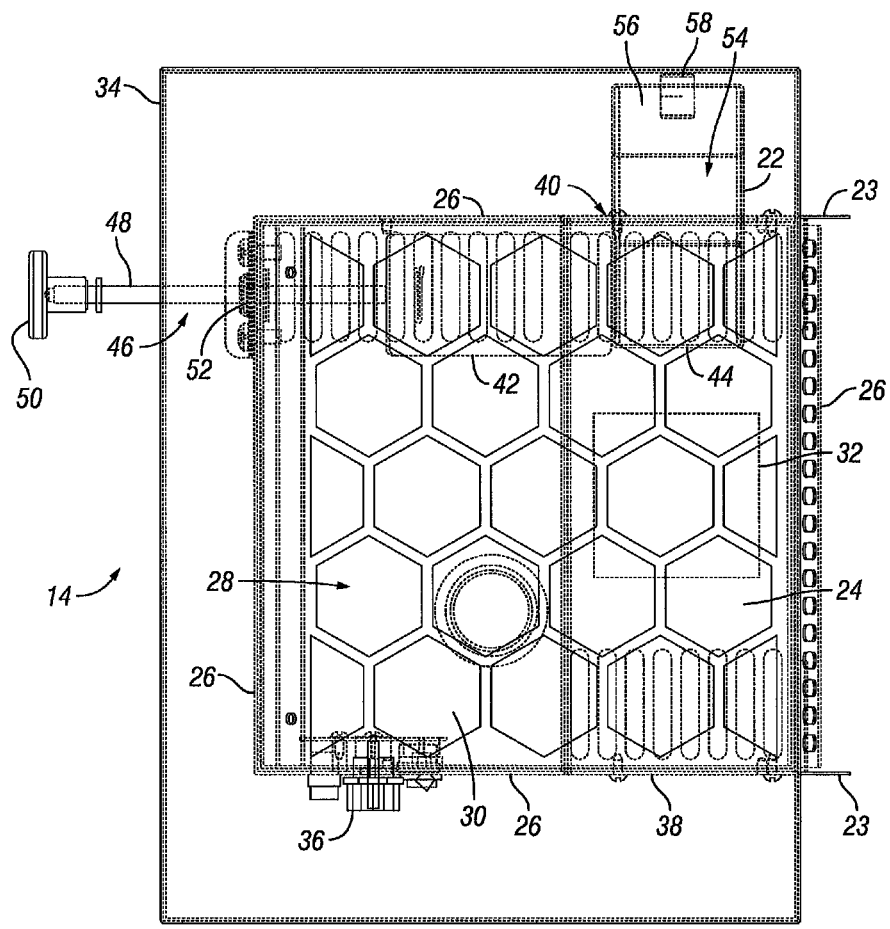
FIG. 3C is a top plan view of the hopper of FIG. 3A in which the walls of the hopper have been made transparent to reveal the interior structure of the hopper and the discharge chute.

This actuation mechanism 46 is operatively connected to the movable baffle 48 to effectuate movement of the movable baffle 42 between the closed position and the opened position. This particular construction disclosed permits the linear translation of the rod 48 through the bearing opening 52 in order to effectuate linear translation of the movable baffle between the closed position and the opened position along the base wall 24. When the handle 50 is pushed in towards the side wall 26, as can be seen in FIGS. 2A-2E, the movable baffle 42 is moved to a location in which the movable baffle 42 fully covers the opening 44. However, when the handle 50 is withdrawn or moved away from the side wall 26, the movable baffle 42 is slid back through the oblique side wall 30 to expose the opening 44 in the base wall 24 as is illustrated in FIGS. 3A-3C.

Although the actuation mechanism 46 is illustrated as extending through one of the side walls 26 and the oblique side wall 30, it is contemplated that in alternative constructions, the actuation mechanism does not need to extend through the side walls exactly as illustrated. For example, the actuation mechanism 46 could extend through one or more of side walls and/or the base wall. Additionally, other types of actuation mechanisms than are illustrated might be used. For example, other mechanical or electromechanical actuation mechanisms might be used to cause movement of the moveable baffle. Such actuation mechanisms do not necessarily require linear translation of the movable baffle. For example, the movable baffle might rotate to selectively cover the opening or follow some other path of movement.

During use of the grill 10, with the movable baffle 42 initially in the closed position, the pellets are added to the interior volume 28 of the hopper 14. Because the movable baffle 42 is in the closed position and the opening 44 is covered, the fuel pellets are substantially retained in the interior volume 28 of the hopper 14 for supplying to the heating device for preparation of the food product via the opening 32. As mentioned above, these pellets may be fed from the hopper 14 using the auger and channel arrangement 16 and heated using heating elements 18 to produce heat and smoke for the heating and smoking chamber 12.

However, at some point before the pellets in the hopper 14 have fully been consumed, it may be decided that the pellets should be removed or evacuated from the hopper 14 (for example, to replace the pellets with another type of pellet or to simply remove the pellets for storage or for use in another grill). Upon movement of the movable baffle 42 from the closed position to the opened position (in the illustrated example, this is performed by pulling the handle 50 away from the side wall 26), the opening 44 is uncovered to accommodate an evacuation of the fuel pellets from the interior volume 28 of the hopper 14 through an exit passage 54 of the discharge chute 22 to an outlet 56. With the interior volume 28 of the hopper 14 in communication with the exit passage 54 of the discharge chute 22, gravity can cause the pellets from the hopper 14 to pass through the opening 44, into the discharge chute 22, and out the outlet 56. Any remaining pellets in the hopper 14 that are not evacuated by gravity can be brushed into the opening 44 to facilitate their removal via the discharge chute 22. Notably, this evacuation of pellets from the hopper 14 occurs without passing the fuel pellets from the hopper 14 through the auger and channel arrangement 16, the heating elements 18, and the heating and smoking chamber 12.

It is contemplated that the discharge chute 22 can further support a hook 58 proximate the outlet 56. On this hook 58, a handle of a bucket (or other holder or tray) may be attached, such that the evacuated pellets from the hopper 14 are collected in the bucket. These collected and unused pellets can be stored and then be refilled into this or another hopper at a later time.

With the pellets removed from the hopper 14, the handle 50 can be pushed back in, so that the movable baffle 42 again covers the opening 44, such that the interior volume 28 of the hopper 14 is no longer in communication with the exit passage 54 of the discharge chute 22. With the movable baffle 42 again being in the closed position, the hopper 14 can be refilled with pellets. For example, pellets of another flavor may be filled into the hopper 14 for continued use of the grill 10.

Figure 4:
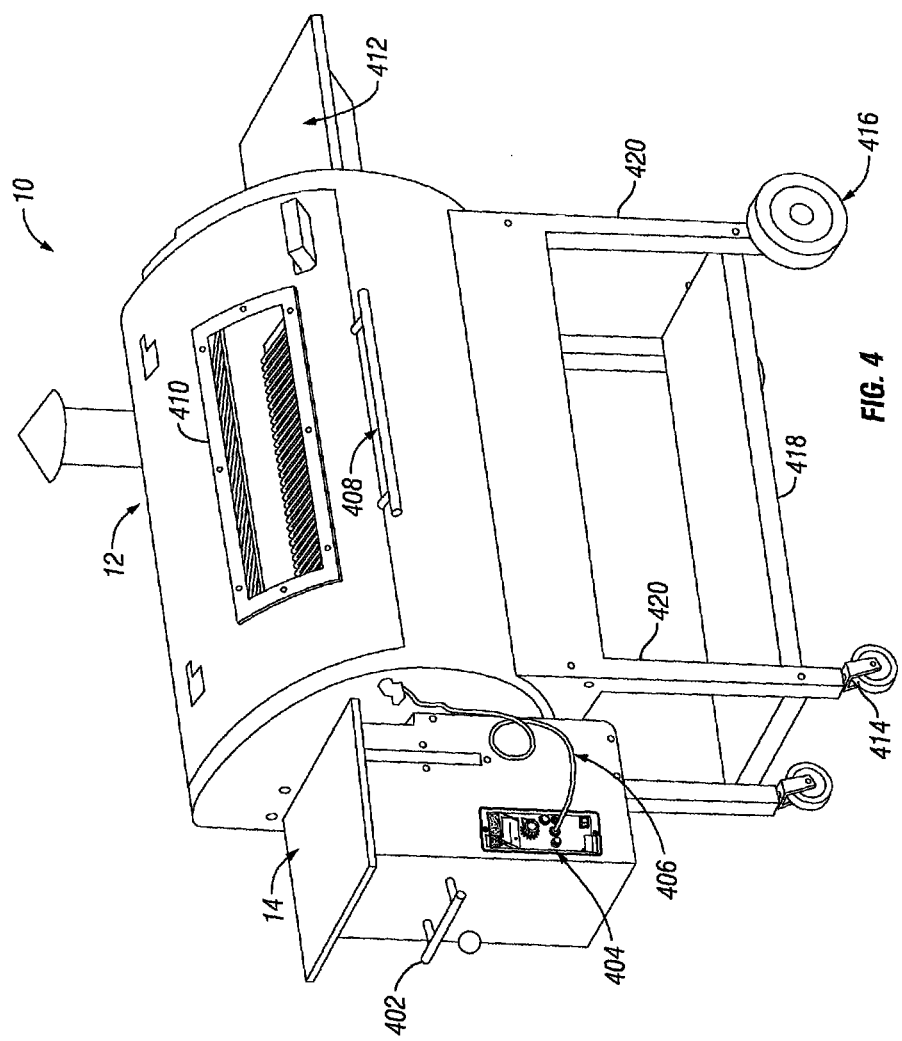
FIG. 4 is a perspective view of an example grill incorporating the present hopper.

FIG. 4 is a perspective view of an example grill 10 that may incorporate the present hopper. Grill 10 includes heating/smoking chamber 12 and hopper 14. Hopper 14 includes a handle 402 that may facilitate moving of grill 10 or removal of hopper 14 from the heating/smoking chamber 12. A controller 404 is positioned on hopper 14 and can enable a user to control the rate at which fuel is fed into the heating/smoking chamber 12. A temperature probe 406 can be provided on hopper 14 enabling a cook to measure a temperature of a food stuff contained within the heating/smoking chamber 12. A handle 408 can be positioned on the heating/smoking chamber 12 to enable a cook to open the heating/smoking chamber 12 to add or remove objects therefrom or to inspect food as it cooks.

A window 410 can be installed into the heating/smoking chamber 12 so that food can be observed cooking without opening the heating/smoking chamber 12. This can be useful to reduce the need to open the heating/smoking chamber 12, which would otherwise cause a lot of heat to escape the heating/smoking chamber 12. The window 410 can provide significant benefit, therefore, in cases where grill 10 uses a fuel source that cannot heat the heating/smoking chamber 12 quickly, such as a pellet-based fuel source and in which heat should be retained within the heating/smoking chamber 12 whenever possible.

The heating/smoking chamber 12 of grill 10 may also include a shelf 412 connected thereto. The body of grill 10 is mounted to legs 420, each of which includes either a swivel caster 414 or wheel 416 to facilitate movement of grill 10. A shelf 418 can be connected between the legs 420.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. An apparatus adapted to hold fuel pellets for supplying to a heating device for a food product, the apparatus comprising:

a hopper including a base wall with side walls extending upwardly therefrom, the base wall and side walls defining an interior volume of the hopper;

an opening located in the base wall of the hopper;

a discharge chute extending downwardly from the hopper and providing an exit passage extending from the opening located in the base wall of the hopper to an outlet of the discharge chute;

a movable baffle positioned to selectively cover the opening in the base wall of the hopper, the movable baffle having a closed position in which the movable baffle covers the opening in the base wall of the hopper such that the interior volume of the hopper and the exit passage of the discharge chute are not in substantial communication with one another and the movable baffle further having an opened position in which the interior volume of the hopper and the exit passage of the discharge chute are in substantial communication with one another; and an actuation mechanism that extends through at least one of the base wall and the side walls of the hopper in which the actuation mechanism is operatively connected to the movable baffle to effectuate movement of the movable baffle between the closed position and the opened position in a direction of linear translation along base wall and the actuation mechanism is a rod that links an exterior handle to the movable baffle.

2. The apparatus of claim 1, wherein, when the interior volume of the hopper contains the fuel pellets and the movable baffle is in the closed position, the fuel pellets are substantially retained in the hopper for supplying to the heating device for the food product and wherein, upon movement of the movable baffle from the closed position to the opened position, the opening is uncovered to accommodate an evacuation of the fuel pellets from the hopper through the exit passage of the discharge chute to the outlet and without passing the fuel pellets from the hopper through the heating device.

3. The apparatus of claim 1, wherein the movable baffle is substantially planar and is substantially parallel with the base wall.

4. The apparatus of claim 1, wherein the heating device is at least one of a grill and a smoker.

5. The apparatus of claim 1, wherein the heating device is a combination grill and smoker.

6. The apparatus of claim 1, further comprising a hook supported by the discharge chute proximate the outlet wherein the hook is adapted to receive a bucket thereon for collection of the fuel pellets evacuated from the hopper.

7. The apparatus of claim 1, further comprising a viewing window disposed on at least one of the side walls of the hopper, wherein the viewing window permits a user to view a level of the fuel pellets inside the hopper from an exterior of the hopper.

8. The apparatus of claim 7, wherein the viewing window includes an optically transparent material.

\* \* \* \* \*